Dec. 27, 1932.  C. D. BOLIN  1,892,379
INDICATING DEVICE
Filed April 17, 1930

Inventor
CHAS D. BOLIN
By  E. O. Huffman
Att'y.

Patented Dec. 27, 1932

1,892,379

UNITED STATES PATENT OFFICE

CHARLES D. BOLIN, OF ST. LOUIS, MISSOURI

INDICATING DEVICE

Application filed April 17, 1930. Serial No. 445,163.

My invention relates to a "side wall" oven thermometer, its object being to embody in such an instrument an improved mechanical temperature indicating means of the general type which produces a simulation of a liquid column thermometer. Specifically, the object of the invention is to embody indicating means of this type in a side wall thermometer in a convenient and inexpensive manner.

Figure 1:
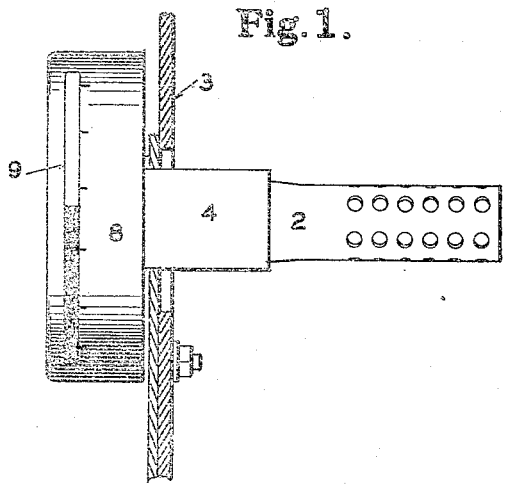
Figure 2:
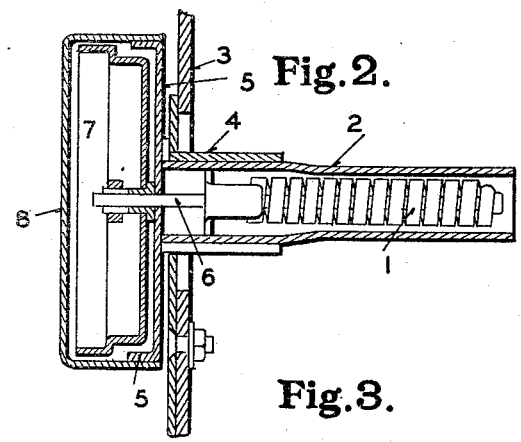
Figure 4:
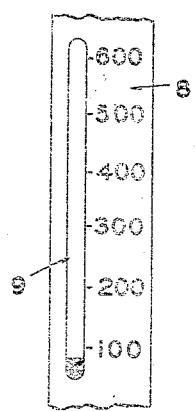
Figure 5:
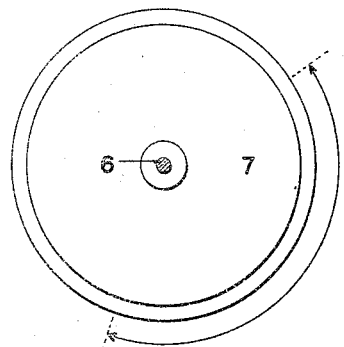
Figure 3:
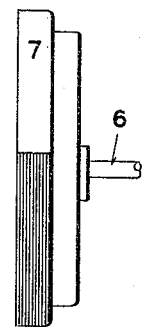

In the accompanying drawing Figure 1 is a side elevational view of a thermometer embodying my invention; Figure 2 is a vertical cross-sectional view; Figure 3 is a side elevational view of the indicating element; Figure 4 is a developed view of the side of the instrument shown in Figure 1, showing the scale markings, indicating the preferred position of the indicating element at atmospheric temperature; and Figure 5 is a rear elevational outline of the indicating element with circular arrow showing the extent of the colored portion of the indicator for the purposes herein described.

The temperature responsive means 1 of the thermometer may be of the common spiral bi-metallic type enclosed in a mounting tube 2 extending through the wall 3 of the oven and which tube may be carried in a mounting tube 4 and attached plate secured to the oven wall, as indicated. To the end of the tube 2 is secured a disk 5 through which the indicator shaft 6 extends.

In the form shown, the indicator is a flanged disk element 7 mounted on the end of the shaft 6 to rotate therewith. The cup-shaped casing member 8 embraces the indicator and is supported from the disk 5. This casing member 8 is provided with a narrow extended peripheral opening 9 located adjacent its bottom and in alignment with the periphery of the indicator flange.

A peripheral portion of the surface of the indicator member which is aligned with the opening in the casing is marked to contrast with the face of the casing adjacent the opening and with other portions of the surface of the indicator which may, in any rotative position thereof, be visible through said opening. Suitably, the indicating portion may be colored red and, preferably, the length of this portion is greater than the length of the casing opening, or at least than the length of the scale indications on the casing adjacent said opening whereby, when the indicator disk is rotated, in response to increase in temperature, from the position indicated in Figure 4, the appearance is produced of a column of liquid rising from a point below one end of the casing opening, the length of said column being in proportion to the effective temperature. Thus an indicating means is produced by which the temperature of an oven is determined by a glance.

In addition to its easy readability, the thermometer herein described has the advantages of simplicity of construction, absence of any part subject to injury or enclosed parts which might be obscured by dirt; and the scale indications, being on the exterior of the casing, may be readily kept clean.

Having fully described my invention, what I claim as new and desire to secure by Letters Patent of the United States is:

1. In an oven thermometer, a support comprising an element adapted to be projected through the wall of an oven and a casing supporting portion outside the oven, a central shaft, an indicating element carried at its outer end, said element comprising a portion having an extended arcuate peripheral surface, a cup-shaped casing embracing the indicating element and having a narrow circumferentially extending scale opening through its side wall adjacent to its bottom and scale indications adjacent said opening, said arcuate surface of the indicating element having a rotative path of movement in alignment with and adjacent said opening and bearing a continuous extended marking on its periphery contrasting with the marking of the casing adjacent the scale opening, said marking having terminus whereby it may cooperate with the scale to effect temperature indication, and temperature responsive means for rotating the indicator shaft.

2. An oven thermometer comprising an opaque cup-shaped casing having a narrow circumferentially extending opening through its side wall adjacent its bottom and scale indications adjacent said opening, temperature responsive means, and an indicator actuated by said means and comprising a portion having an arcuate peripheral surface rotatively movable within the casing into opposition with said opening and colored to contrast with a portion of the casing adjacent said opening, the length of said colored portion being greater than the length of the scale on the casing and said colored portion having a terminus whereby it may cooperate with the scale to effect temperature indication.

In testimony whereof, I hereunto affix my signature, this 9th day of April, 1930.

CHARLES D. BOLIN.